(12) United States Patent
Harris et al.

(10) Patent No.: US 11,634,075 B2
(45) Date of Patent: Apr. 25, 2023

(54) ACTUATOR SYSTEM, REAR VIEW DEVICE, MOTOR VEHICLE AND ADJUSTMENT METHOD

(71) Applicant: MOTHERSON INNOVATIONS COMPANY LIMITED, London (GB)

(72) Inventors: Tom Harris, Portchester (GB); Warwick Jones, Portchester (GB)

(73) Assignee: Motherson Innovations Company Limited, London (GB)

( * ) Notice: Subject to any disclaimer, the term of this patent is extended or adjusted under 35 U.S.C. 154(b) by 52 days.

(21) Appl. No.: 17/599,516

(22) PCT Filed: Mar. 5, 2020

(86) PCT No.: PCT/EP2020/055921
§ 371 (c)(1),
(2) Date: Sep. 28, 2021

(87) PCT Pub. No.: WO2020/200640
PCT Pub. Date: Oct. 8, 2020

(65) Prior Publication Data
US 2022/0169177 A1    Jun. 2, 2022

(30) Foreign Application Priority Data

Apr. 4, 2019    (DE) .................. 10 2019 108 848

(51) Int. Cl.
*B60R 1/072*      (2006.01)
*F16D 11/14*      (2006.01)
(Continued)

(52) U.S. Cl.
CPC .............. *B60R 1/072* (2013.01); *F16D 11/14* (2013.01); *F16H 37/122* (2013.01); *G02B 7/1821* (2013.01)

(58) Field of Classification Search
CPC ....... B60R 1/072; G02B 7/1821; F16D 11/14; F16H 37/122
(Continued)

(56) References Cited

U.S. PATENT DOCUMENTS 3,609,014 A     9/1971   Kurz, Jr.
3,972,597 A *   8/1976   Repay ................... B60R 1/072
                                                    248/479
(Continued)

FOREIGN PATENT DOCUMENTS

DE    10 2019 108 848 B3    6/2020
GB         2032367 A         5/1980
(Continued)

OTHER PUBLICATIONS

International Search Report and Written Opinion dated May 14, 2020 of International application No. PCT/EP2020/055921 (9 pages).
(Continued)

*Primary Examiner* — Ricky D Shafer
(74) *Attorney, Agent, or Firm* — Jones Day

(57) ABSTRACT

Systems and methods are provide for an actuator system for a rear view device of a motor vehicle, configured for adjustment of a component when being connected to the actuator system The actuator system may include a drive system arranged to rotate a bayonet gear, which is coupled via at least one engagement element to a latching barrel to axially move or rotate the latching barrel along or around a rotational axis, wherein the latching barrel is configured to engage into at least one of two worm gears or to rotate the engaged worm gear when being moved or rotated. The latching barrel may be cylindrically shaped with a cylindrical surface as an engagement surface and oppositely arranged first and second sides each directed towards one of the two worm gears.

25 Claims, 4 Drawing Sheets

Figure 1:
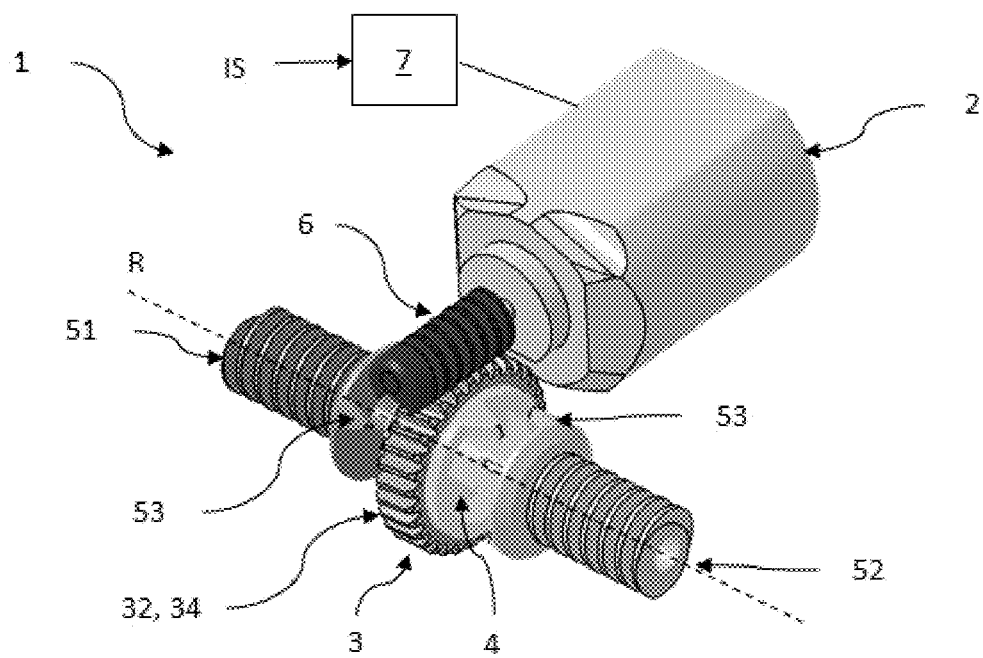

(51) Int. Cl.
*F16H 37/12* (2006.01)
*G02B 7/182* (2021.01)

(58) Field of Classification Search
USPC .................................................. 359/872, 877
See application file for complete search history.

(56) References Cited

U.S. PATENT DOCUMENTS

| | | | | |
|---|---|---|---|---|
| 4,153,342 | A * | 5/1979 | Mittelhauser | B60R 1/072 359/877 |
| 4,196,971 | A | 4/1980 | Mittelhauser | |
| 4,202,603 | A | 5/1980 | Miyauchi | |
| 4,273,417 | A * | 6/1981 | Mittelhauser | B60R 1/062 359/873 |
| 4,324,454 | A * | 4/1982 | Kumai | B60R 1/072 359/873 |
| 5,159,854 | A * | 11/1992 | Mino | F16H 3/003 192/48.92 |
| 6,164,148 | A * | 12/2000 | Brouwer | B60R 1/072 192/48.92 |
| 7,004,594 | B2 * | 2/2006 | Shimizu | B60R 1/072 359/876 |
| 2003/0233899 | A1 * | 12/2003 | Ishiyama | F16H 1/16 74/425 |
| 2004/0105180 | A1 * | 6/2004 | Shimizu | B60R 1/072 359/872 |
| 2007/0290117 | A1 | 12/2007 | Hetrick et al. | |

FOREIGN PATENT DOCUMENTS

| | | |
|---|---|---|
| JP | S54 331 A | 1/1979 |
| JP | S56 108329 A | 8/1981 |
| JP | 2 556112 Y2 | 12/1997 |
| NL | 2 012 670 B1 | 7/2016 |
| WO | WO 03/086 816 A1 | 10/2003 |

OTHER PUBLICATIONS

Office Action dated Sep. 3, 2019 of German Application No. DE 10 2019 108 848.8 (in German only) (5 pages).

* cited by examiner

ACTUATOR SYSTEM, REAR VIEW DEVICE, MOTOR VEHICLE AND ADJUSTMENT METHOD

CROSS-REFERENCE TO RELATED APPLICATIONS

This application is a National Stage Entry of International Patent Application No. PCT/EP2020/055921, filed Mar. 5, 2020, which claims the benefit of priority to German Patent Application No. 10 2019 108 848.8, filed Apr. 4, 2019, each of which is incorporated by reference in its entirety for all purposes.

The invention relates to an actuator system for a rear view device of a motor vehicle, a rear view device comprising such an actuator system and a motor vehicle comprising such a rear view device. In addition, the invention refers to a method to operate an actuator system for a rear view device of a motor vehicle for adjustment of a component like a rear view element relative to the body of the motor vehicle.

In rear view devices, such as rear view mirror devices, it is state-of-the-art to use actuators in order to adjust the mirror plate so that it matches the field of view appropriate for the respective driver. Furthermore, powerfolds for folding the mirror, for example while the vehicle is in a parking situation, also using actuators are known in the art.

However, incorporating one or more actuators in order to provide the functionality for adjusting the mirror plate and/or folding the mirror lead to numerous parts required for proper operation of the mirror. Moreover, existing electromechanical actuators are often noisy, heavy and large, and particularly not failsafe with respect to external forces applied to the rear view device, especially to the mirror glass. In addition, assembly, implementation and maintenance of the respective actuators is often hard. All these circumstances in turn lead to relatively high costs associated with known actuators.

The same aspects apply mutatis mutandis also to advance vehicle replacement systems, such as rear view cameras, which also require the functionality of adjusting the field of view and/or folding the system by mechanical movement of the system.

It would be desirable to have an electromechanical actuator system available, which is at least less heavy, less noisy and smaller than the devices according to prior art. In would be furthermore desirable to only used one motor to drive a component, in case of rear view devices the rear view element, at least in two directions.

It is an object of the invention to provide an electromechanical actuator system, which is at least less heavy and smaller than the devices according to prior art comprising only one motor to drive a component at least in two directions.

This problem is solved by an actuator system for a rear view device of a motor vehicle, configured for adjustment of a component, preferably a rear view element, when being connected to the actuator system, said actuator system comprising a drive system arranged to rotate a bayonet gear, which is coupled via at least one engagement element to a latching barrel to axially move or rotate the latching barrel along or around a rotational axis, wherein the latching barrel is configured to engage into at least one of two worm gears or to rotate the engaged worm gear when being moved or rotated, wherein the latching barrel is cylindrically shaped with a cylindrical surface as an engagement surface and oppositely arranged first and second sides each directed towards one of the two worm gears, wherein the two worm gears are arranged along the rotational axis as a first worm gear adjacent to the first side and as a second worm gear adjacent to the second side of the latching barrel, wherein one or more guiding member(s) guiding the at least one engagement element extend on the engagement surface from the first side to the second side while at least partly circulating around the engagement surface, wherein the guiding member(s) comprise(s) at least a first and a second stop position, wherein either the first worm gear or the second worm gear is rotated by the latching barrel when the engagement element is located at the first or second stop position, while the latching barrel is moved in axial direction along the rotational axis in order to engage either into the first or second worm gear when the at least one engagement element moves along the guiding member(s) between the first and second stop positions.

The invention relates to an actuator system for providing an adjustment to a component, e.g. an optical surface, as can be applied for instance for rear facing external mirrors of motor vehicles, whereby the drive system will be referred to as a glass actuator. This and other applications require that the orientation of the surface to be moved relative to a nominal centre, in all directions and up to a maximum extend. The concept of the innovation is to provide an innovative clutch system comprising the bayonet gear, the engagement element, the latching barrel with guiding members to guide the engagement element and two worm gears being separately operational by rotating the bayonet gear clockwise or counter-clockwise enabling a two axes adjustment, where the motion of one axis or its associated linkages has no effect on the motion of the other. The worm gears may move separate jacks in case of a screw clutch actuator or rotate two axles independently in case of a micro glass actuator. The innovative actuator concept only comprises a limited number of components resulting in a small and low weight actuator system, where only one drive system is necessary to actuate two axles independently.

In an embodiment the bayonet gear is shaped as a ring with an inner surface directed towards the latching barrel. With a ring shape the bayonet gear can be easily attached to the latching barrel. The cylindrical outer shape of the latching barrel fits into the ring shaped hollow bayonet gear resulting in a very compact clutch established by bayonet gear and latching barrel.

In another embodiment the engagement element comprises a first pin arranged on the inner surface engaging into at least one groove comprised by the guiding member(s). The combination pin-groove is a simple and reliable structure to securely engage the bayonet gear into the latching barrel. The grooves can be structure in a suitable geometry adapted to the shape of the pin. The path of the grooves can be design in a desired way to execute rotating of the worm gears independently clockwise and counter-clockwise.

In a preferred embodiment the engagement element further comprise a second pin arranged oppositely to the first pin on the inner surface, both pins engaging into the suitably shaped grooves. The second pin improves the stability of the guiding of the engagement element within the grooves. Furthermore, a second pin provides a redundancy for guiding the axially moving and/or rotating latching barrel relative to the rotated bayonet gear.

In another embodiment the guiding member further comprises a first and second reverse stop position located on the engagement surface between the first and a second stop position in order to enable rotating the engaged worm gear into an opposite rotational direction, and each guiding member is suitable shaped for enabling engagement of the engagement element into the first and second stop positions in case of the bayonet gear is rotated in one rotational direction and into the first and second reverse stop positions in case of the bayonet gear is rotated in the opposite rotational direction. The reverse stop positions enable to rotate both worm gear forth and back on demand and independently. For rotating one worm gear forth and back the corresponding stop and reverse stop positions are arranged in a axial distance to each other, which is close enough that the latching barrel does not intervene with the other non-rotated worm gear when switching the rotation direction of the worm gear being intended to be rotated into the opposite direction.

In another embodiment the first and/or second worm gear comprise one or more engagement members facing towards the first and/or second side of the latching barrel to engage with the latching barrel. The engagement members of the worm gear improve the reliability of rotating the worm gears on demand.

In a preferred embodiment the engagement members have a triangular shape parallel to the rotational axis with a tip pointing towards the latching barrel. The triangular shape is a very suitable shape to reliable engage into corresponding members of the latching barrel.

In another embodiment each of the first and second worm gears comprise two engagement members being oppositely arranged on the respective worm gear at the same distance to the rotational axis. This provides a stable engaging position with respect to the latching barrel.

In another embodiment the latching barrel comprises at least one counter engagement member suitable shaped and arranged to engage into at least one of the engagement members of at least one of the two worm gears. The suitable shape might be also a triangular shape adapted to the shape of the engagement members of the worm gears. The engagement member and counter engagement member may contact over one entire side of the triangular shapes of both members facing together.

In another embodiment the engagement and counter engagement members comprise sliding surfaces directed towards each other in order to engage or release each other by sliding along the sliding surfaces. The sliding surfaces enable a smooth contacting of both engagement members. Furthermore, a reliable contacting can be established by continued axial movement of the latching barrel, if the current positions of both engagement and counter engagement members allow this.

In another embodiment the engagement and counter engagement members are released from each other by changing the rotational direction of the bayonet gear. The shape of the engagement and counter engagement members enable to disconnect simply by reversing the rotational direction.

In another embodiment the drive system drives a motor gear, preferably a motor worm gear, engaging into teeth arranged on the bayonet gear to rotate the bayonet gear. This arrangement provides a simple and reliable connection of the clutch established by bayonet gear and latching barrel to the drive system.

In a preferred embodiment the teeth are arranged on an outer surface of the bayonet gear enabling a simple and compact engagement of the motor gear into the bayonet gear.

In another embodiment the drive system comprises at least one element of the group of DC motor, piezo system, shape memory alloy.

In another embodiment the drive system is adapted to rotate the bayonet gear clockwise and/or anti-clockwise in order to be able to rotate the worm gears in both direction independently.

In another embodiment the actuator system further comprises a control unit adapted to initiate the drive system in response to a corresponding input signal in case of a demanded adjustment of the component. The control system can control the required rotations e.g. to execute a two axis adjustment of the component in an effective way.

In another embodiment the control unit is adapted to hold the position of the first and second worm gear in its current position in case of no input signal for the demanded adjustment is received. Once in the desired position, it might be required that the component, e.g. a mirror element of the rear view device, maintains its orientation against small loads and vibrations, independent of the application of power to the system.

In another embodiment the drive system comprises at least one disengagement mechanism for allowing manual adjustment of the orientation of the component without conflict with the drive system, preferably the disengagement can be realized by an applied force exceeding a threshold force for manual adjustment. It might be required that the component is movable by external means, provided said threshold force is overcome, whereupon the component (and system) should be reasonably controllable by that force, to achieve a new orientation that is accurate within the scope of ergonomics. For example, this is the case in automotive applications, where the actuator system is part of a rear view mirror device attached to a side of a vehicle to prevent damages of the rear view mirror in case of external forces acting on the rear view mirror. This disengagement mechanism might be inherent within the drive mechanism.

The invention further relates to a rear view device for a motor vehicle comprising a rear view element and an actuator system according to the present invention mounted to a housing, wherein the rear view element is connected to the actuator system for adjustment of the rear view element relative to the body of the motor vehicle. The actuator system may provide a two axis adjustment for at least one optical surface of the rear view element, whereby the actuator system can be referred to a glass actuator. The rear view element may comprise a mirror element, a display element and/or a camera. The two axles can be mounted into a housing, such that they are held in orientation and coupled to a single drive mechanism, also mounted within the housing. The housing may also comprise feedback elements to determine position of the adjustment axes and all electronic elements to control the glass adjustment function. Additional control functions might be incorporated into the device package.

In an embodiment the rear view element comprises at least one of a rear view mirror and display attached to at least on backing plate, wherein the actuator system is arranged to drive the backing plate in order to adjust the rear view element. The use of a backing plate enables a fast attachment of the rear view mirror element to the rear view device by providing suitable attaching mechanisms between backing plate and rear view mirror element, e.g. via attaching clips.

The invention further relates to a motor vehicle comprising at least one rear view device according to the present invention attached to the vehicle. Commonly the vehicle comprises two rear view devices at the outside of the vehicle body, on driver and passenger side, as well as one interior rear view device. At least one, preferably all these rear view devices may comprise an actuator system according to the present invention. The term vehicle may denote any kind of vehicle being commonly equipped with at least one rear view device.

The invention further relates to a method to operate an actuator system for a rear view device of a motor vehicle, for adjustment of a component, preferably a rear view element, when being connected to the actuator system, comprising steps of providing the actuator system in a released position, with the actuator system comprising a drive system adapted to rotate a bayonet gear around a rotational axis, the bayonet gear being coupled via at least one engagement element to a latching barrel, wherein the latching barrel is cylindrically shaped with a cylindrical surface as an engagement surface and oppositely arranged first and second sides each directed towards one of two worm gears being arranged along the rotational axis as a first worm gear adjacent to the first side and as a second worm gear adjacent to the second side of the latching barrel, wherein shaped guiding members to guide the at least one engagement element extend on the engagement surface from the first side to the second side while at least partly encompassing the engagement surface, wherein the guiding member comprises at least a first and a second stop position;

moving the latching barrel from the released position in axial direction along the rotational axis by rotating the bayonet gear via the drive system in one rotational direction, wherein the at least one engagement element moves along the guiding members between first and second stop positions until the engagement element is engaged in the first or second stop position;

rotating the latching barrel by rotating the bayonet gear by the drive system further in the same rotational direction, when the engagement element is engaged in the first or second stop position;

engaging one of the worm gears by the latching barrel as a result of the latching barrel being firstly axially moved and secondly rotated; and rotating the engaged worm gear by rotating the bayonet gear via the drive system further in the same rotational direction.

In an embodiment the method further comprises the step of transferring the actuator system back into the released position
a) by rotating the bayonet gear via the drive system in an opposite rotational direction resulting in a dis-engagement of the previously engaged worm gear and of the engagement element from the first or second stop position and
b) by moving the latching barrel in opposite axial direction along the rotational axis.

In an embodiment the method further comprises performing the steps of moving, rotating and engaging in order to rotate the other worm gear by further rotating the bayonet gear via the drive system in the opposite rotational direction in line with the rotation of the transferring step.

In an embodiment the method further comprises the step of rotating the same worm gear in opposite rotational direction by engaging the bayonet gear via the engagement element into a corresponding first or second reverse stop position while rotating the latching barrel by rotating the bayonet gear via the drive system in the opposite rotational direction.

The above listed embodiments can be used individually or in any combination to provide the device and the process in accordance with the invention.

Figure 2:
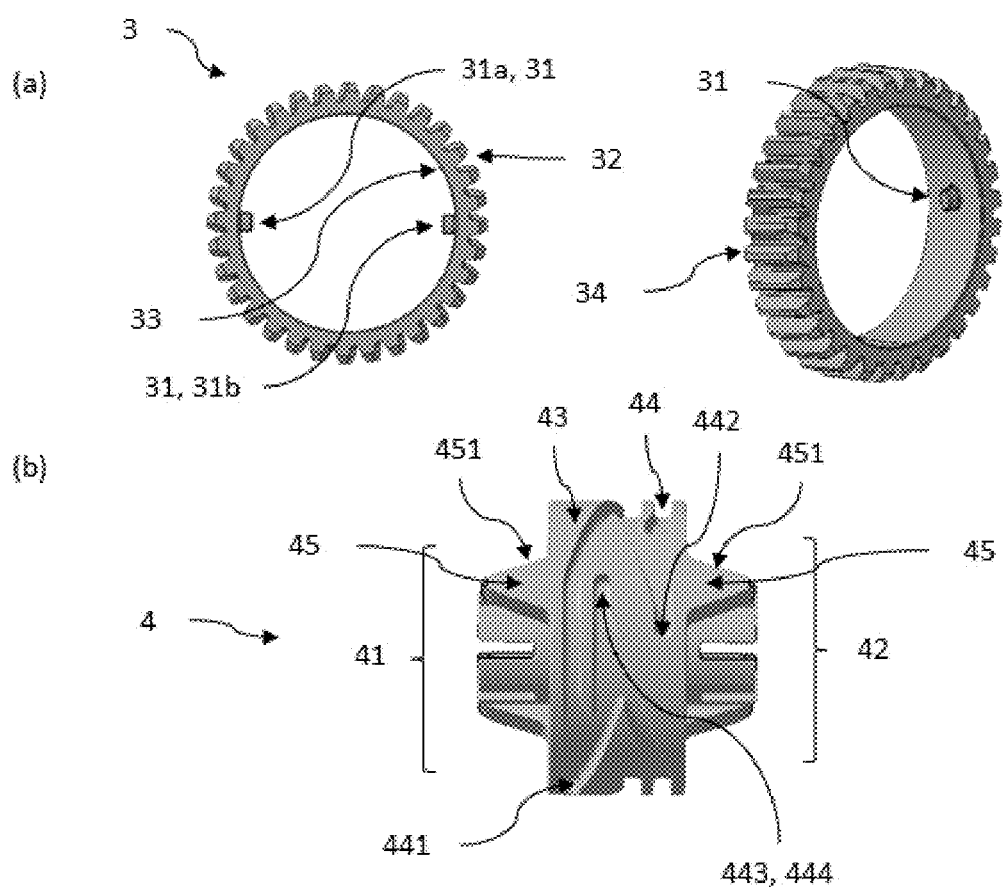
Figure 3:
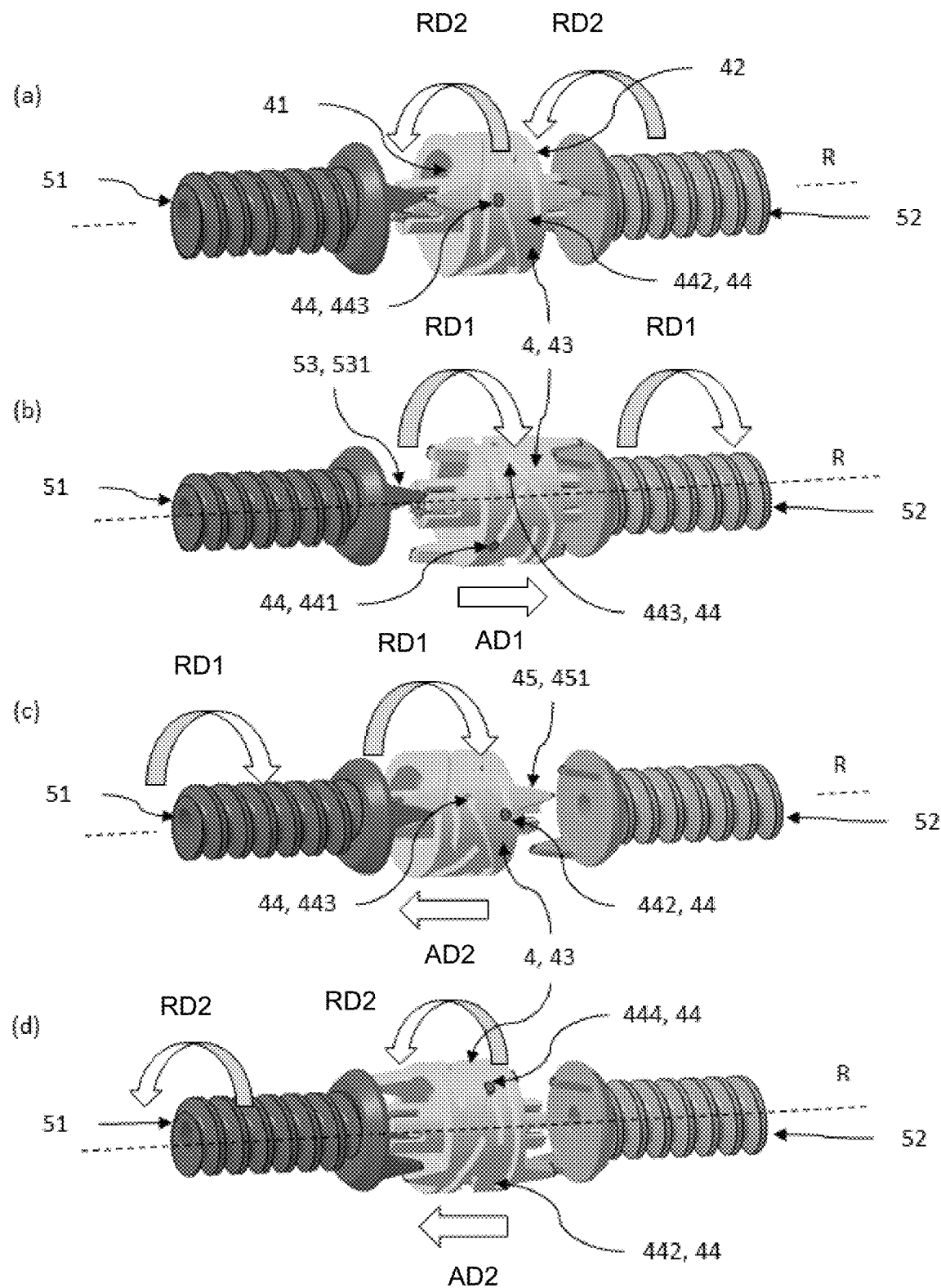
Figure 4:
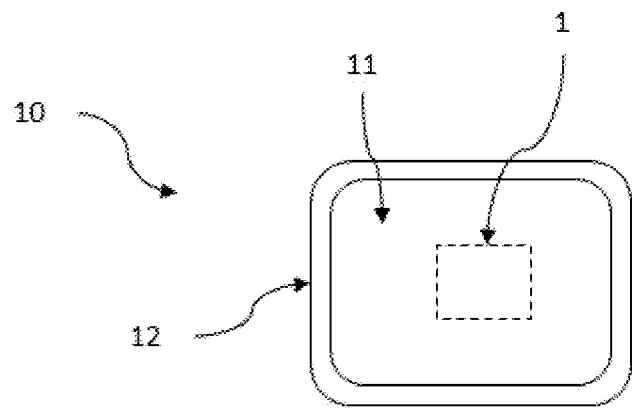
Figure 5:
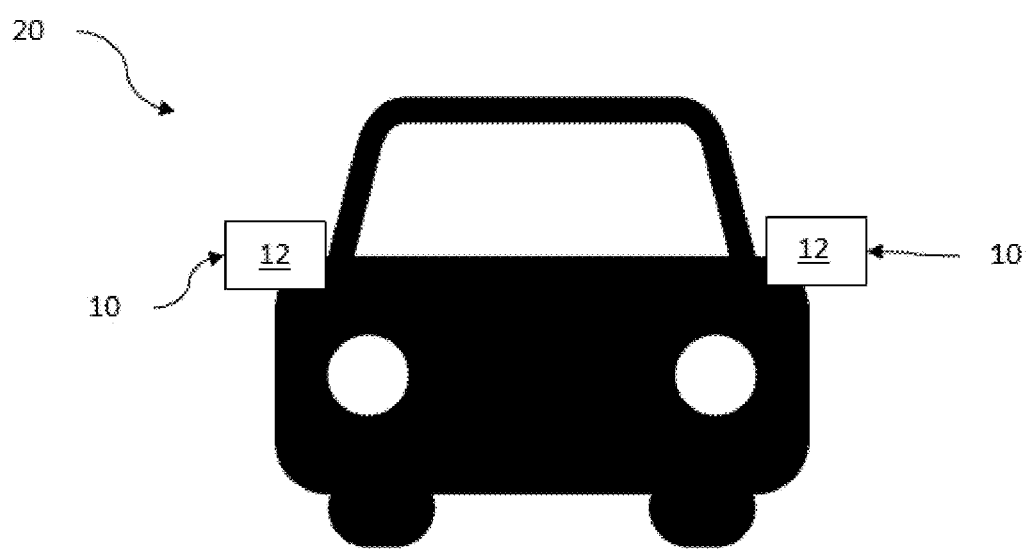
Figure 6:
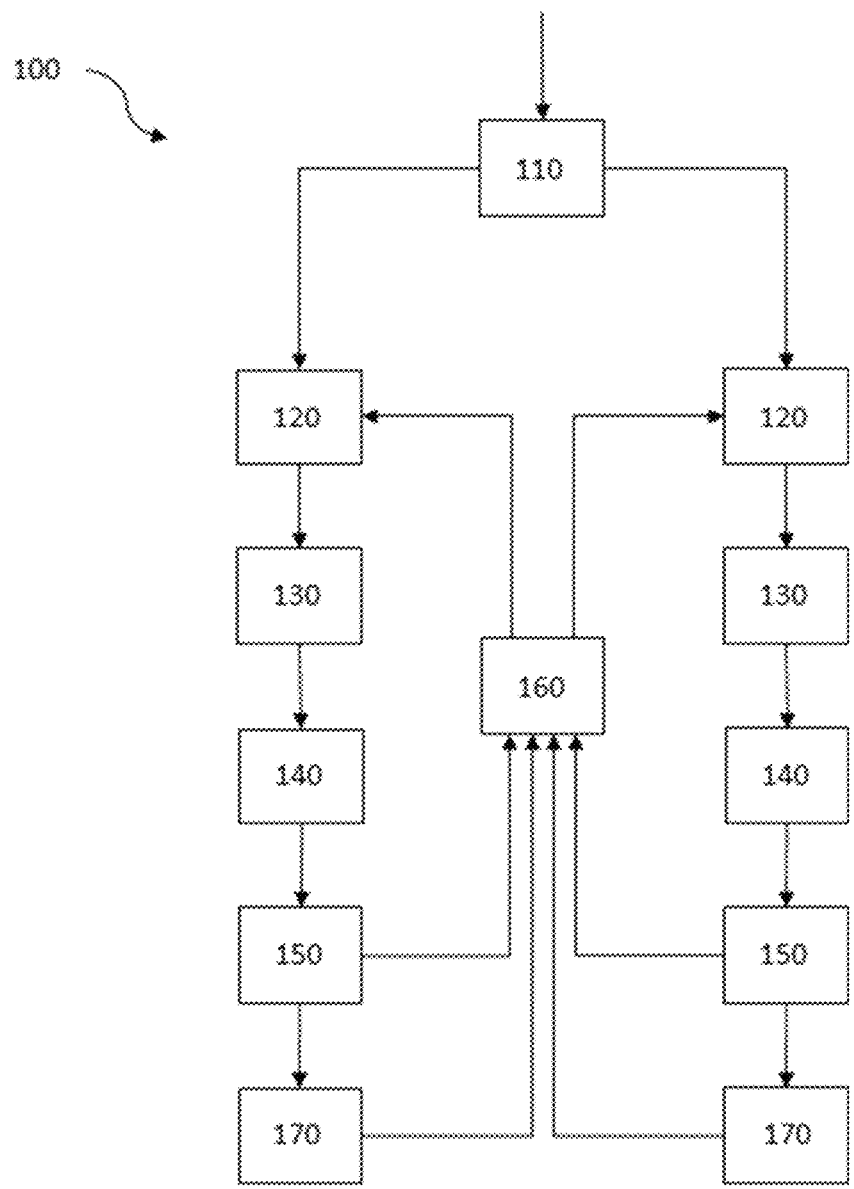

Advantages of the invention and its respective disclosure will be readily appreciated as the same becomes better understood by reference to the following detailed description when considered in connection with the accompanying drawings, wherein FIG. 1: shows an actuator system according to the present disclosure in a perspective view;

FIG. 2: shows a bayonet gear of the actuator system, with (a) the bayonet gear in a side and a perspective view, and a latching barrel of the actuator system, with (b) the latching barrel in a side view;

FIG. 3: shows different operation modes of the actuator system of FIG. 1 in perspective views with (a) rotation of left hand worm gear anti-clockwise, (b) axially movement of the latching barrel and rotation of the left hand worm gear clockwise, (c) axially movement of the latching barrel and rotation of the right hand worm gear clockwise, and (d) axially movement of the latching barrel and rotation of the right hand worm ear anti-clockwise;

FIG. 4: is a schematic view of a rear view device comprising the actuator system according to the present disclosure;

FIG. 5: is a schematic view of a vehicle comprising two rear view devices according to the present disclosure; and FIG. 6: illustrates a method to operate the actuator system according to the present disclosure.

The disclosure will now be described with occasional reference to the specific embodiments of the disclosure. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. As used in the description of the disclosure and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present disclosure. Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

The term "rearview device", as used herein, is defined to mean a device attached to the vehicle and which permits the vehicle operator to adequately see rearward and sideward.

FIG. 1 shows an embodiment of the actuator system 1 for a rear view device 10 enabling an adjustment of a component 11, preferably a rear view element 11, when being connected to the actuator system 1 according to the present disclosure in a perspective view comprising a drive system 2 rotates a bayonet gear 3 via a motor worm gear 6 engaging into teeth arranged on the outer surface 32 of the bayonet gear 3, wherein the drive system 2 comprises at least one element of the group of DC motor, piezo system, shape memory alloy and where the drive system 2 is adapted to rotate the bayonet gear 3 clockwise and/or anti-clockwise. The bayonet gear 3 is coupled via at least one engagement element 31 to a latching barrel 4, which when being engaged to the latching barrel 4 axially moves in a first direction AD1 or in a second opposite direction AD2 or rotates in a first rotational direction RD1 or in a second opposite rotational direction RD2 the latching barrel 4 along a rotational axis R in order to engage into at least one of two worm gears 51 or to rotate the engaged worm gear, where the latching barrel 4 is cylindrically shaped with a cylindrical surface as an engagement surface 43 and oppositely arranged first and second sides 41, 42 each directed towards one of two worm gears 51, where the two worm gears are arranged along the rotational axis R as a first worm gear 51 adjacent to the first side 41 and as a second worm gear 52 adjacent to the second side 42 of the latching barrel 4, where guiding members 44 to guide the at least one engagement element 31 extending on the engagement surface 43 from the first side 41 to the second side 42 while at least partly circulating around the engagement surface 43, where the guiding members 44 comprise at least a first and a second stop position 441, 442, where either the first worm gear 51 or the second worm gear 52 is rotated by the latching barrel 4 in case of the engagement element 31 being located at the first or second stop position 441, 442, while the latching barrel 4 is moved in axial direction along the rotational axis R in order to engage either into the first worm gear 51 or second worm gear 52 in case of the at least one engagement element 31 moves along the guiding members 44 between first and second stop positions 441, 442. The actuator system 1 further comprises a control unit 7 adapted to initiate the drive system 2 in response to a corresponding input signal in case of a demanded adjustment of the component 11, wherein the control unit 7 is adapted to hold the position of the first worm gear 51 and second worm gear 52 in its current position in case of no input signal IS for the demanded adjustment is received. The drive system 2 may also comprise at least one disengagement mechanism for allowing manual adjustment of the orientation of the component 11 without conflict with the drive system 2, preferably the disengagement can be enacted by an applied force exceeding a threshold force for manual adjustment.

The guiding members 44 may be provided in form of slots, grooves or as a complex geometrical shape suited to guide at least one of the engagement element 31a or engagement element 31.

FIG. 2 shows an embodiment of (a) the bayonet gear 3 in a side and a perspective view, and (b) the latching barrel 4 in a side view. The bayonet gear 3 is shaped as a ring with an inner surface 33 directed towards the latching barrel 4. The engagement element 31 comprises a first pin 31a arranged on the inner surface 33 and a second pin 31b arranged oppositely to the first pin 31a on the inner surface 33, both pins 31a, 31b engaging into the guiding members 44, see FIG. 2b.

The latching barrel 4 is cylindrically shaped with a cylindrical surface as an engagement surface 43 and oppositely arranged first and second sides 41, 42 each directed towards one of two worm gears (see worm gear 51 and worm gear 52 of FIG. 1). The engagement surface 43 of the latching barrel 4 comprises the guiding members 44 further comprising the first and second stop positions 441, 442 and a first and second reverse stop position 443, 444 located on the engagement surface 43 between the first and a second stop position 441, 442 in order to enable to rotated the engaged worm gear into an opposite rotational direction, where the guiding members are suitable shaped enabling engagement of the engagement element into the first and a second stop positions 441, 442 in case of the bayonet gear 3 is rotated in the first rotational direction RD1 and into the first and a second reverse stop positions 441, 442 in case of the bayonet gear 3 is rotated in the second opposite rotational direction RD2. The latching barrel 4 further comprises two counter engagement member 45 on each side 41, 42 suitable shaped and arranged to engage into corresponding engagement members 53 of at least one of the two worm gears.

FIG. 3 shows different operation modes of the actuator system of FIG. 1 in perspective views:
FIG. 3(a) shows a rotation RD2 of left hand worm gear 52 anti-clockwise;
FIG. 3(b) shows an axially movement AD1 of the latching barrel 4 and rotation RD1 of the left hand worm gear 52 clockwise;
FIG. 3(c) shows an axially movement AD2 of the latching barrel 4 and rotation RD1 of the right hand worm gear 51 clockwise and
FIG. 3(d) shows an axially movement AD2 of the latching barrel 4 and rotation RD2 of the right hand worm gear 51 anti-clockwise.

These different operation modes are described in further detail with reference to FIG. 6 below.

The first worm gear 51 and/or the second worm gear 52 comprise(s) two engagement members 53 being oppositely arranged on the worm gear 51 or worm gear 52 at the same distance to the rotational axis R and facing towards the first and/or second side 41, 42 of the latching barrel 4 to engage with the latching barrel 3, where the engagement members 53 have a triangular shape parallel to the rotational axis R with a tip pointing towards the latching barrel 4. Correspondingly the latching barrel 4 comprises two counter engagement member 45 on each side 41, 42 suitable shaped and arranged to engage into both engagement members 53 of both worm gears 51, 52, however only into one worm gear at the same time. The engagement members 53 and the counter engagement members 45 comprise sliding surfaces 531, 451 directed towards each other in order to engage or release each other by sliding along the sliding surfaces 531, 451. The engagement members 53 and the counter engagement members 45 are released from each other by changing the rotational direction of the latching barrel 4.

FIG. 4 is a diagram illustrating a rear view device 10 comprising the actuator system 1 according to the present disclosure mounted to a housing 12, where the rear view element 11 is a rear view mirror. The actuator system 1 comprises the latching barrel 4 which in turn comprises at least one counter engagement member 45 suitable shaped and arranged to engage into at least one of the engagement members 53 of worm gear 51 and/or worm gear 52 connected to the actuator system 1 in order to enable an adjustment of the rear view element 1. The rear view element 11 might be a rear view mirror attached to a backing plate (not shown here), where the actuator system 1 (dashed square) is arranged behind the backing plate and the mirror element to drive the backing plate in order to adjust the rear view mirror 11.

FIG. 5 is a diagram illustrating a vehicle 20 comprising two rear view devices 10 according to the present disclosure. Commonly the vehicle 20 comprises two rear view devices 10 at the outside of the vehicle 20 on driver and passenger side as well as one interior rear view device (not shown here). At least one, preferably all these rear view devices 10 may comprise an actuator system 1 according to the present disclosure. The term vehicle 20 may denote any kind of vehicle being equipped with at least one rear view device 10.

FIG. 6 is a flowchart illustrating an embodiment of a method 100 to operate the actuator system 1 according to the present disclosure for a rear view device 10 enabling an adjustment of a component 11, preferably a rear view element 11, when being connected to the actuator system 1, comprising steps of providing 110 the actuator system 1 in a released position comprising a drive system 2 adapted to rotate a bayonet gear 3 around a rotational axis R, the bayonet gear 3 being coupled via at least one engagement element 31 to a latching barrel 4, where the latching barrel 4 is cylindrically shaped with a cylindrical surface as an engagement surface 43 and oppositely arranged first and second sides 41, 42 each directed towards one of two worm gears being arranged along the rotational axis R as a first worm gear 51 adjacent to the first side 41 and as a second worm gear 52 adjacent to the second side 42 of the latching barrel 4, where guiding members 44 to guide the at least one engagement element 31 extending on the engagement surface 43 from the first side 41 to the second side 42 while at least partly circulating around the engagement surface 43, where the guiding members 44 comprise at least a first and a second stop position 441, 442; moving 120 the latching barrel 4 from the released position in axial direction along the rotational axis R by rotating the bayonet gear 3 by the drive system 2 in one rotational direction, where the at least one engagement element 31 moves along the guiding members 44 between first and second stop positions 441, 442 until the engagement element 31 is engage in the first or second stop positions 441, 442; rotating 130 the latching barrel 4 by rotating the bayonet gear 3 by the drive system 2 further in the same rotational direction, when the engagement element 31 is engaged in the first or second stop positions 441, 442; engaging 140 worm gear 51 or worm gear 52 by the latching barrel 4 as a result of the latching barrel 4 being firstly axially moved and secondly rotated; and rotating 150 the engaged worm gear by rotating the bayonet gear 3 by the drive system 2 further in the same rotational direction. The method may further comprise the step of rotating 170 the same worm gear in opposite rotational direction by engaging the bayonet gear via the engagement element 31 into a corresponding first or second reverse stop position 443, 444 while rotating 130 the latching barrel 4 by rotating the bayonet gear 3 by the drive system 2 in the opposite rotational direction. If the other worm gear shall be rotated it requires transferring 160 the actuator system 1 back into the released position by rotating the bayonet gear 3 by the drive system 2 in an opposite rotational direction as before resulting in a dis-engagement of the previously engaged worm gear and of the engagement element 31 from the first or second stop positions 441, 442 followed by the step of moving the latching barrel in opposite axial direction according to the applied opposite rotational direction. Starting from this released position the other worm gear can be rotated by performing the steps of moving 120, rotating 130 and engaging 140 and rotating 150 the other worm gear by further rotating the bayonet gear 3 by the drive system 2 in the same rotational direction as done in the transferring step 160.

The invention has been described in an illustrative manner. It is to be understood that the terminology, which has been used, is intended to be in the nature of words of description rather than of limitation. Many modifications and variations of the disclosure are possible in light of the above teachings. Therefore, within the scope of the appended claims, the invention may be practiced other than as specifically described.

| Reference Signs | |
|---|---|
| 1 | actuator system |
| 2 | drive system |
| 3 | bayonet gear |
| 4 | cylindrically shaped latching barrel |
| 6 | motor (worm) gear |
| 7 | control unit |
| 10 | rear view device |
| 11 | rear view mirror element |
| 12 | housing |
| 20 | vehicle |
| 31 | engagement element |
| 31a | first pin |
| 31b | second pin |
| 32 | outer surface |
| 33 | inner surface |
| 34 | teeth of the bayonet gear |
| 41 | first side of the latching barrel |
| 42 | second side of the latching barrel |
| 43 | engagement surface of the latching barrel |
| 44 | guiding member |
| 45 | counter engagement member |
| 51 | first worm gear |
| 52 | second worm gear |
| 53 | engagement member |
| 100 | method to operate the actuator system 1 |
| 110 | providing the actuator system in a released position |
| 120 | moving the latching barrel from the released position in axial direction along the rotational axis |
| 130 | rotating the latching barrel |
| 140 | engaging one of the worm gears by the latching barrel as a result of the latching barrel being firstly axially moved and secondly rotated |
| 150 | rotating the engaged worm gear by rotating the bayonet gear |
| 160 | transferring the actuator system back into the released position by rotating the bayonet gear in an opposite rotational direction as before |
| 170 | rotating the same worm gear in opposite direction |
| 441 | first stop position |
| 442 | second stop position |
| 443 | first reverse stop position |
| 444 | second reverse stop position |
| 451 | sliding surface of the counter engagement member |
| 531 | sliding surface of the engagement member |
| AD1, AD2 | axial direction |
| IS | input signal |
| RD1, RD2 | rotational direction |
| R | rotational axis |

The invention claimed is:

1. An actuator system for a rear view device of a motor vehicle, configured for adjustment of a component when being connected to the actuator system, said actuator system comprising:
   a drive system arranged to rotate a bayonet gear, which is coupled via at least one engagement element to a latching barrel to axially move or rotate the latching barrel along or around a rotational axis (R), wherein the latching barrel is configured to engage into at least one of two worm gears or to rotate an engaged worm gear when being moved or rotated, wherein the latching barrel is cylindrically shaped with a cylindrical surface as an engagement surface and oppositely arranged first and second sides each directed towards one of the two worm gears, wherein the two worm gears are arranged along the rotational axis (R) as a first worm gear adjacent to the first side and as a second worm gear adjacent to the second side of the latching barrel, wherein one or more guiding members guiding the at least one engagement element extend from the engagement surface, from the first side to the second side, while at least partly circulating around the engagement surface, wherein the one or more guiding member comprise at least a first and a second stop position, wherein either the first worm gear or the second worm gear is rotated by the latching barrel when the engagement element is located at the first or second stop position, while the latching barrel is moved in axial direction along the rotational axis (R) in order to engage either into the first or second worm gear when the at least one engagement element moves along the guiding members between the first and second stop positions.

2. The actuator system according to claim 1, wherein the bayonet gear is shaped as a ring with an inner surface directed towards the latching barrel.

3. The actuator system according to claim 2, wherein the engagement element comprises a first pin arranged on the inner surface engaging into at least one groove comprised by the one or more guiding members.

4. The actuator system according to claim 3, wherein the engagement element further comprises a second pin arranged oppositely to the first pin on the inner surface, both pins engaging into grooves provided by the guiding members.

5. The actuator system according to claim 1, wherein
the one or more guiding members further comprises a first and second reverse stop position located on the engagement surface between the first and a second stop position allowing for rotating the engaged worm gear into an opposite rotational direction (RD2), and
the one or more guiding members are configured to enable engagement of the engagement element into the first and second stop positions when the bayonet gear is rotated in one rotational direction (RD1) and into the first and second reverse stop positions when the one or more bayonet gear is rotated in the opposite rotational direction (RD2).

6. The actuator system according to claim 1, wherein the first and/or second worm gear comprises one or more engagement members facing towards the first and/or second side of the latching barrel to engage with the latching barrel.

7. The actuator system according to claim 6, wherein each engagement member has a triangular shape parallel to the rotational axis (R) with a tip pointing towards the latching barrel.

8. The actuator system according to claim 6, wherein each of the first and second worm gears comprise two engagement members being oppositely arranged on the respective worm gear at the same distance to the rotational axis (R).

9. The actuator system according to claim 6, wherein the latching barrel comprises at least one counter engagement member arranged to engage into at least one of the engagement members of at least one of the two worm gears.

10. The actuator system according to claim 9, wherein the engagement and the counter engagement members comprise sliding surfaces directed towards each other in order to engage or release each other by sliding along the sliding surfaces.

11. The actuator system according to claim 9, wherein the engagement and counter engagement members are released from each other by changing the rotational direction of the bayonet gear.

12. The actuator system according to claim 1, wherein the drive system drives a motor gear engaging into teeth arranged on the bayonet gear to rotate the bayonet gear.

13. The actuator system according to claim 12, wherein the teeth are arranged on an outer surface of the bayonet gear.

14. The actuator system according to claim 1, wherein the drive system comprises at least one element of the group of DC motor, piezo system, shape memory alloy.

15. The actuator system according to claim 1, wherein the drive system is adapted to rotate the bayonet gear clockwise and/or anti-clockwise.

16. The actuator system according to claim 1, further comprising a control unit adapted to initiate the drive system in response to a corresponding input signal for adjustment of the component.

17. The actuator system according to claim 16, wherein the control unit is adapted to hold the position of the first and second worm gear in its current position in case of no input signal is received.

18. The actuator system according to claim 1, where the drive system comprises at least one disengagement mechanism for allowing manual adjustment of the orientation of the component without conflict with the drive system mechanisms allows for a manual adjustment by applying a force exceeding a threshold force for manual adjustment.

19. A rear view device for a motor vehicle comprising a rear view element and an actuator system according to claim 1 mounted to a housing, wherein the rear view element is connected to the actuator system for adjustment of the rear view element relative to the body of the motor vehicle.

20. The rear view device according to claim 19, wherein the rear view element comprises at least one of a rear view mirror and display attached to at least one backing plate, wherein the actuator system is arranged to move the backing plate relative to at least one of the body of the motor vehicle and the housing.

21. A motor vehicle comprising at least one rear view device according to claim 19.

22. A method of operating an actuator system for a rear view device of a motor vehicle for adjustment of a component, when being connected to the actuator system, the method comprising:
providing the actuator system in a released position, with the actuator system comprising a drive system adapted to rotate a bayonet gear around a rotational axis (R), the bayonet gear being coupled via at least one engagement element to a latching barrel, wherein the latching barrel is cylindrically shaped with a cylindrical surface as an engagement surface and oppositely arranged first and second sides each directed towards one of two worm gears being arranged along the rotational axis (R) as a first worm gear adjacent to the first side and as a second worm gear adjacent to the second side of the latching barrel, wherein shaped guiding members to guide the at least one engagement element extend on the engagement surface from the first side to the second side while at least partly circulating around the engagement surface, wherein the guiding member comprises at least a first and a second stop position;

moving the latching barrel from the released position in axial direction along the rotational axis (R) by rotating the bayonet gear via the drive system in one rotational direction, wherein the at least one engagement element moves along the guiding members between first and second stop positions until the engagement element is engaged in the first or second stop position;

rotating the latching barrel by rotating the bayonet gear by the drive system further in the same rotational direction, when the engagement element is engaged in the first or second stop position;

engaging one of the worm gears by the latching barrel as a result of the latching barrel being firstly axially moved and secondly rotated; and rotating the engaged worm gear by rotating the bayonet gear via the drive system further in the same rotational direction.

23. The method according to claim 22, further comprising:

transferring the actuator system back into the released position by a) rotating the bayonet gear via the drive system in an opposite rotational direction resulting in a dis-engagement of the previously engaged worm gear and of the engagement element from the first or second stop position, and b) moving the latching barrel in opposite axial direction along the rotational axis (R).

24. The method according to claim 23, further comprising:

moving, rotating and engaging in order to rotate the other worm gear by further rotating the bayonet gear via the drive system in the opposite rotational direction in line with the rotation of the transferring step.

25. The method according to claim 22, further comprising:

rotating the same worm gear in opposite rotational direction by engaging the bayonet gear via the engagement element into a corresponding first or second reverse stop position (443, 444) while rotating (130) the latching barrel (4) by rotating the bayonet gear (3) via the drive system (2) in the opposite rotational direction (RD2 or RD1).

\* \* \* \* \*